Jan. 23, 1945.   P. V. DI COSMO ET AL   2,367,672
FUSE ASSEMBLY MACHINE
Filed Sept. 5, 1941   3 Sheets-Sheet 1
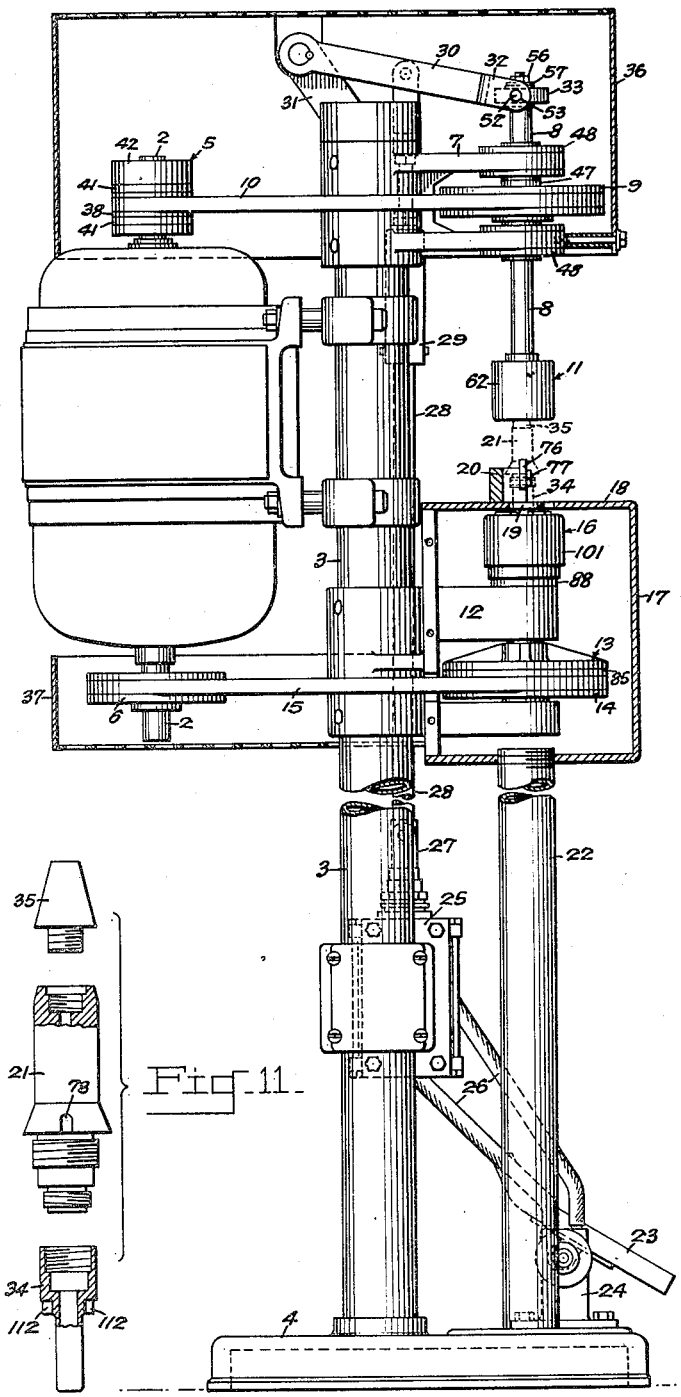
INVENTORS
Pasquale V. DiCosmo
Matthew C. Ricciardi
BY
ATTORNEYS

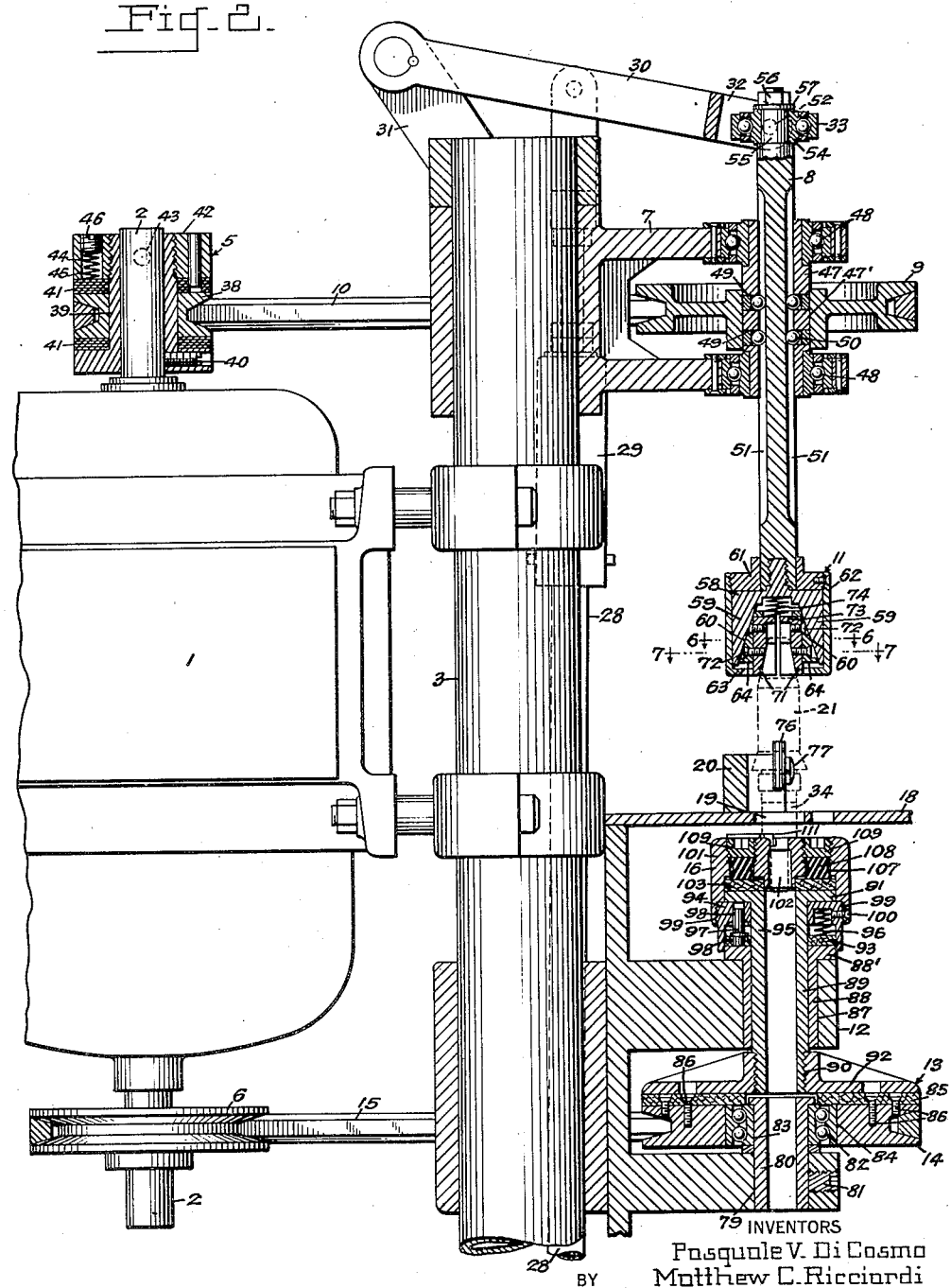

Jan. 23, 1945.                P. V. DI COSMO ET AL                2,367,672
                              FUSE ASSEMBLY MACHINE
                    Filed Sept. 5, 1941           3 Sheets-Sheet 3
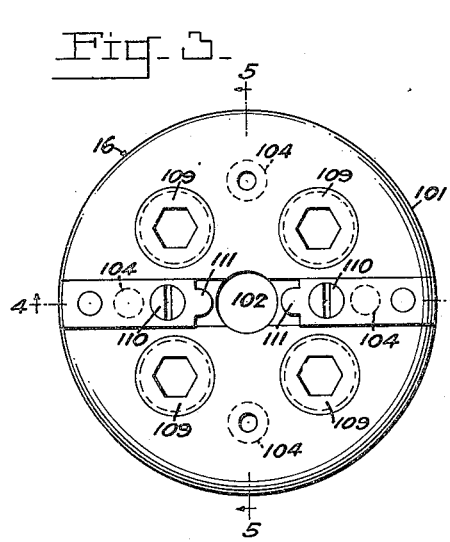
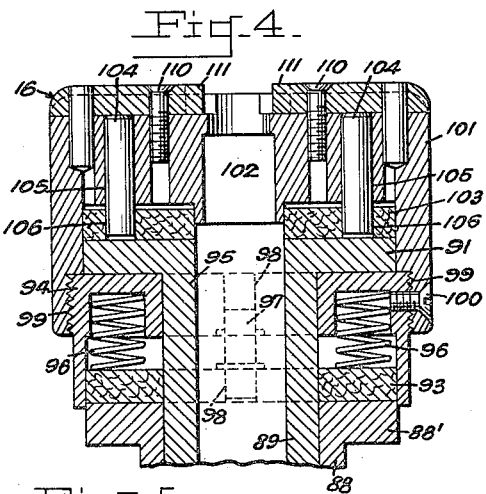
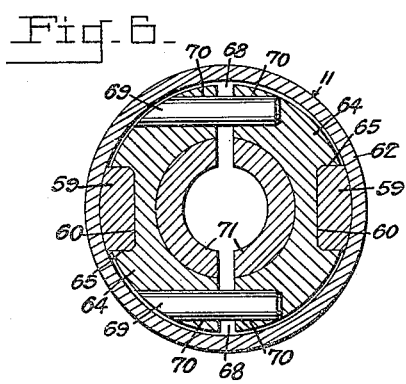
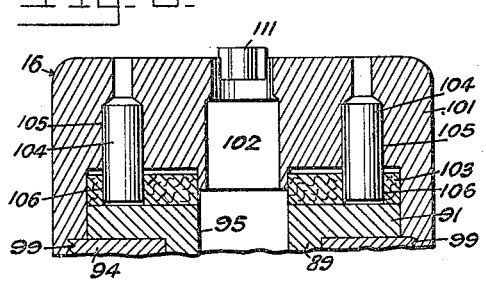
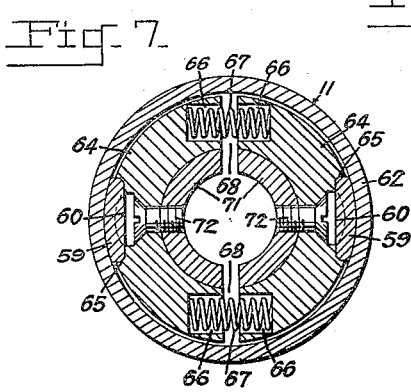
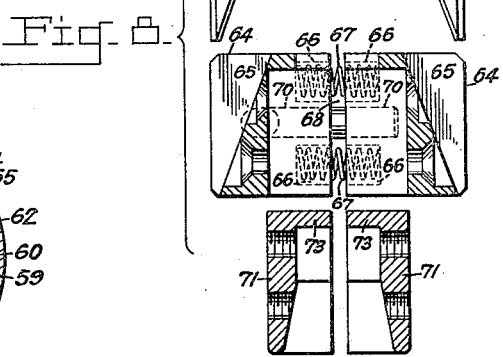
INVENTORS
Pasquale V. DiCosmo
Matthew C. Ricciardi
BY
ATTORNEYS Patented Jan. 23, 1945

2,367,672

UNITED STATES PATENT OFFICE 2,367,672

FUSE ASSEMBLY MACHINE

Pasquale V. di Cosmo and Matthew C. Ricciardi, Dover, N. J.

Application September 5, 1941, Serial No. 409,688

2 Claims. (Cl. 29—240)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an assembling device, and more particularly to a machine for assembling a pair of threaded components to the opposite ends of a threaded body.

An object of this invention is to provide an accurate reliable machine for quickly assembling threaded articles.

A further object of the invention is to provide a safe, fast machine for assembling threaded ordnance articles which are loaded with an explosive.

The specific nature of the invention as well as other objects and advantages thereof will clearly appear from a description of a preferred embodiment as shown in the accompanying drawings in which:

Fig. 1 is a side elevational view of the assembling device with the guard members broken away to show details of construction, Fig. 2 is an enlarged elevational view of the drive mechanism and the work holding fixtures with portions in section for clearer illustration, Fig. 3 is a plan view of the lower chuck or work holder, Fig. 4 is a vertical longitudinal section of the lower chuck on the line 4—4 of Fig. 3, Fig. 5 is a sectional view on the line 5—5 of Fig. 3 showing the upper portion of the lower chuck, Fig. 6 is a sectional view on the line 6—6 of Fig. 2 showing details of the upper chuck, Fig. 7 is a sectional view on the line 7—7 of Fig. 2 showing additional chuck details, Fig. 8 is an exploded view of the upper chuck with parts in section for clearer illustration, Fig. 9 is a front elevational view of the body holding fixture, Fig. 10 is an enlarged plan view of the body holding fixture as seen from the side of the machine, Fig. 11 is an elevational view with parts in section of the components of a threaded work piece which is being assembled in the machine, and Fig. 12 is a bottom plan view of the assembled work piece.

In the drawings, an electric motor 1 having a vertical drive shaft 2 extending from both ends is secured to a column 3 which is mounted on a base 4. An adjustable torque pulley 5 is attached to the upper end of shaft 2 and a sheave 6 is keyed to the lower end of the shaft. A forked member 7 is secured near the top of column 2 and has journalled therein a reciprocating spindle 8. A sheave 9 is mounted on spindle 8 and is confined between the fork in member 7. A V-belt 10 interconnects pulley 5 and sheave 9 and imparts rotation to the spindle 8. Spindle 8 actuates a chuck 11 and is adapted to reciprocate with respect to member 7 and sheave 9 in a manner which will be more fully described in another part of the specification.

A bifurcated support 12 is secured to the column 3 adjacent sheave 6 and has journalled therein a rotataable clutch 13 provided with a drive sheave 14. Sheave 14 is coupled to sheave 6 by V-belt 15. A chuck 16 is journalled in the top of the bifurcated support 12. Clutch 13 transmits rotation to the interconnected chuck 16 which is provided with a slip clutch which will be described later.

Surrounding sheave 14 and the chuck 16 is a metal guard 17 which has a flat top 18 having an aperture 19 over the chuck. Top 18 is located at a convenient height to make a satisfactory work table. Mounted on the top 18 is a work holder 20 for engaging the body portion 21 of an object to be assembled. The lower portion of the guard 17 communicates with an explosion chamber 22 which rests on the base 4. A wrought iron pipe serves very satisfactorily as an explosion chamber.

A treadle 23 is coupled to a rotary valve 24 which is connected to a reciprocating fluid motor 25 by suitable conduits 26. Motor 25 is located on column 3. A piston rod 27 on motor 25 is attached through a link 28 having a resilient connector 29 to an arm 30 which is pivoted to an upright 31 on the column 3. Arm 30 has a forked end 32 which engages the upper end of a shoe 33 which is coupled to the spindle 8. The shoe 33 permits the spindle to rotate and is adapted to reciprocate it when the arm 30 is oscillated by the reciprocating motor 25 through linkage 27, 28, and 29.

Work holder 20 is conformed to receive and hold fixed the body portion 21 of a partially assembled composite work piece. The lower chuck 16 receives and tightens the base or socket component 34 to the body portion 21 while the reciprocating chuck 11 engages and tightens the upper component or head 35 to the body 21.

Sheet metal guards 36 and 37 are attached in any convenient manner to the column 3 and enclose the other moving elements of the machine.

The adjustable torque pulley 5 comprises a sheave 38 which is rotatably mounted on a flanged bushing 39 which is secured to the drive shaft 2 of the motor by fasteners 40, see Fig. 2. Friction rings 41 separate the sheave from the flanged portion of the bushing 39 and also from a nut 42 which is threaded on the sleeve portion of the bushing and locked thereto by a set screw 43. Coiled springs 44 rest in bores 45 in the nut 42 and are compressed against the upper set of friction rings 41 by adjusting screws 46. Torque is transmitted to the driven sheave 38 in a manner well known concerning slip clutches. The springs 44 may be loaded to the desired extent and thereby regulate the torque necessary to cause the driven sheave to slip.

A bushing 47 is press fitted in the bore 47' in the hub of sheave 9 and is journalled in a pair of anti-friction bearings 48 mounted in the fork of member 7. The bushing 47 is provided with pairs of spaced recesses 49 which receive portions of ball bearings 50 which ride in longitudinal splineways 51 in the spindle 8. As sheave 9 is rotated, the ball bearing coupling imparts rotation to the spindle 8 and also permits the spindle to be reciprocated relative to the bushing 47 and the attached sheave. The forked end 32 of arm 30 engages the shoe 33 through a pivot pin 52 which rests in a pair of aligned apertures 53 in the forked end 32, see Figs. 1 and 2. Shoe 33 forms the outer member of an antifriction bearing race which has its inner portion 54 secured to a cylindrical shank 55 on the end of spindle 8. A nut 56 and a washer 57 secure the shank 55 to the inner portion 54 of the bearing race. This coupling between the arm 30 and the spindle 8 permits the arm 30 to oscillate and impart reciprocation to the spindle 8 and also allows the spindle to rotate at the same time.

Chuck 11 is adapted to engage the head 35 of an article being assembled when the spindle 8 is depressed. Screwed into the base of the spindle is a chuck driver 58 which has spaced depending wedge members 59 with internally disposed cam faces 60, see Figs. 2 and 8. An apertured disk 61 is free to rotate on the spindle 8 above the driver 58 and is secured to a cylindrical cover 62 which has an inwardly directed annular flange 63 at its lower or open end. A pair of semi-cylindrical segmental jaws 64 are located within the cover 62 and are provided with inclined notches 65 which engage the wedge members 59. The jaws 64 are provided with recesses 66 which retain a pair of expanding springs 67, see Fig. 7. These springs normally separate the jaw segments so as to maintain a slight gap 68 between the adjacent faces. A pair of spaced guide pins 69 ride in bores 70 in the jaw segments so as to maintain them parallel at all times, see Fig. 6. Arcuate gripping elements 71 are demountably attached to the individual jaw members by suitable fasteners 72. The upper portion of each gripping element is provided with a flange 73 (see Figs. 2 and 8) which is engaged by the lower end of a coil spring 74 which also bears on the central portion of the driver 58. Spring 74 urges the jaws 64 downward against the flange 63 on the cover 62 while the expanding springs 67 force the jaws apart. When relative movement occurs between the jaws 64 and the driver 58, the cam faces 60 on the wedge members 59 riding in the notches 65 force the jaws 62 inwardly against the residence of springs 67 and clamp a piece of work therein.

The work holder 20 is a U-shaped member attached to the top 18 by convenient fasteners 75, see Figs. 9 and 10. A pair of keys 76 are secured to the arms of member 20 by fasteners 77. These keys project into the notch of the U and are adapted to engage a pair of notches 78 in the body portion 21 of a work piece. When the keys engage these notches in the work piece, it is held securely against rotation.

The lower arm of bifurcated support 12 has a vertical bore 79 which receives a hollow spindle 80 that is secured therein by a set screw 81, see Fig. 2. The inner portion of a bearing race 82 is press fitted on the neck 83 of the spindle 80 which projects beyond the support, and the outer portion of the race is press fitted in a central bore 84 of the sheave 14. A friction ring 85 is secured to the upper face of the sheave by fasteners 86.

The upper arm of the support 12 is provided with a bore 87 which has press fitted therein a bearing sleeve 88. Within the sleeve 88 is journalled an elongated hollow spindle 89 which has a threaded base 90 and a flanged top 91. A clutch plate 92 is fastened to the threaded base 90. Encircling spindle 89 and resting on the flanged top 88' of the bearing sleeve 88 is a friction or brake ring 93, see Figs. 2 and 4. A cup-shaped release bushing 94 surrounds the neck 95 of spindle 89 and is held in engagement with the bottom of flange 91 by expanding springs 96. Release bushing 94 is adapted to rotate independently of spindle 89. Pins 97 rest in aligned bores 98 in the bushing 94 and the friction ring 93 and prevent relative rotation between those members, see Fig. 2. Secured to the release bushing 94 by threads 99 and a lock fastener 100 is a cup-shaped head 101 provided with a central work receiving bore 102. Within the cup is a friction ring 103 which rests on the flanged top 91 of spindle 89. The friction ring 103 is secured against rotation independent of the head 101 by spaced pins 104 which rest in bores 105 and 106 in the head and friction ring respectively, see Figs. 3, 4, and 5. Bores 107 in the top of head 101 receive rubber blocks 108 which are compressed to the desired degree by adjusting screws 109 in the upper ends of the bores, see Figs. 2 and 3. Fasteners 110 secure a pair of keys 111 to the top of the head 101, see Figs. 3 and 4. These keys are adapted to engage a pair of notches 112 in the base or socket portion 34 of a work piece which is to be assembled, see Figs. 11 and 12. The expanding springs 96 normally act to lift the release bushing 94, the spindle 89, and the head assembly upward so that clutch plate 92 is separated from the friction ring 85 on the sheave 14.

The operation of the device is as follows: The head 35 and the base or socket 34 are manually started on the body 21 approximately one turn each. The work piece is then placed in the work holder 20 so that the keys 76 are in engagement with the notches 78 to secure the body 21 against rotation. The base 34 of the work piece extends into bore 102 in the lower chuck 16. Since the motor 1 is running continuously, the operator then opens valve 24 by tilting the treadle 23. Fluid motor 25 is thereby actuated to depress link 28 and consequently the pivoted arm 30 swings downward. Spindle 8 is being rotated as it descends and presents chuck 11 to the head 35 of the work piece.

The gripping elements 71 in the upper chuck come into engagement with the head 35 and as the chuck driver 58 continues to descend, the segmental jaws 64 are advanced inwardly by the cam faces 60 on the wedge members 59. Springs 67 and 74 are compressed during this operation. The head 35 is eventually held firmly by the jaws 64 so that it may be tightened on the body 21.

Downward movement of chuck 11 shortly after it comes in contact with the head 35 forces the socket 34 further into the bore 102 of the lower chuck 16. Keys 111 slip into the notches 112 in the socket and hold it securely. Further depression of the work piece forces the lower chuck head 101, the release bushing 94, and the hollow spindle 89 downward against the resistance of springs 96 and brings the clutch plate 92 into engagement with the friction ring 85 on the drive sheave 14. The lower chuck 16 and the socket 34 now secured therein are put into rotation and both the head and socket are tightened on the body of the work piece.

When the head 35 is tightened the required degree, the spindle 8 and chuck 11 cease to rotate because slip occurs in the adjustable torque pulley 5. Therefore excessive torque cannot be applied so as to injure the head and the body of the work piece.

The socket 34 is threaded on the body 21 by the lower chuck until a predetermined torque is reached whereupon slip occurs between the flange 91 on the driving spindle 89 and the driven head 101. The chuck 16 ceases to rotate indicating the assembly operation is complete.

The operator then reverses valve 24, and the fluid motor 25 through its connecting linkage elevates or retracts the spindle 8 and the upper chuck 11. The spring 74 and the expanding springs 67 force the jaw segments 64 downwardly and outwardly whereupon further movement is restricted by the annular flange 63 on the cover 62 of the chuck. The head is then released from the chuck which moves out of the way of the operator's hands.

When chuck 11 ceases to exert its downward thrust on the work piece, the springs 96 in the lower chuck 16 force the head 101, the release bushing 94, and the hollow spindle 89 upward thus disengaging the clutch plate 92 from the continuously rotating sheave 14. Since the springs 96 push downward on the brake ring 93 which is in engagement with the flange 88' of the fixed bearing sleeve 88, a braking effort is also imparted to the hollow spindle 89 which is still spinning from its own momentum. This braking effort is transmitted through the release bushing 94, the loaded rubber blocks 109 in head 101, and the friction ring 103 which engages the top of the flange 91 on the spinning spindle 81. This arrangement thereby performs the double function of disengaging the clutch and braking the spinning parts. Bringing the lower chuck to rest as quickly as possible expedites production by permitting an additional work piece to be safely inserted in the work holder as soon as the preceding one was removed after assembling.

The resilient connection 29 in the link 28 is designed to prevent an excessive force from being applied to a work piece by the chuck 11 in the event that the work piece is misplaced in the holding fixture.

This machine is particularly adapted to assembling ordnance devices such as fuses which are loaded with an explosive. The danger of a chance explosion during an assembling operation always exists and the instant machine protects the operator therefrom. The lower chuck, spindle, and sheave journal are hollow so that the force of an explosion will be directed into the communicating explosion chamber. Here the shock is absorbed without injury to the operator or the machine. The descending upper chuck impedes upward movement of the force of the explosion thus confining it to the explosion chamber where it is harmlessly expended.

The adjustable torque members in the drive prevent the assembling of distorted or imperfectly threaded objects.

We claim:

1. In a machine for assembling parts of ordnance loaded with explosive, a hollow spindle, a work holding chuck mounted on the spindle and having an opening communicating with one end of the opening through the spindle, a guard surrounding the spindle and chuck and defining an explosion chamber, and a second explosion chamber communicating with the first and located in position to receive the gases of an explosion from the hollow spindle and the first mentioned chamber.

2. In a device for assembling threaded work pieces, a reciprocable and rotatable spindle having a work holder for one of said pieces comprising laterally movable non-reciprocable spring-backed jaws having oppositely disposed cam surfaces and a jaw operating member rigidly and directly connected to said spindle having correspondingly shaped wedge members cooperating with said jaws to close them yieldingly against said springs upon the downward movement of said spindle to grip the work piece and adapted also to release said piece upon the upward movement of the spindle, and a second spindle below and axially in line with the first and having means for holding another of said work pieces.

PASQUALE V. DI COSMO.
MATTHEW C. RICCIARDI.